United States Patent
Kusafuka et al.

(10) Patent No.: US 7,002,655 B2
(45) Date of Patent: Feb. 21, 2006

(54) SETTING A COMMON ELECTRODE AND AUXILIARY ELECTRODE OF AN IMAGE DISPLAY APPARATUS TO DIFFERENT ELECTRIC POTENTIALS

(75) Inventors: Kaoru Kusafuka, Kawasaki (JP); Mitsuru Ikezaki, Sagamihara (JP)

(73) Assignee: Chi Mei Optoelectronics Corp., Tainan (TW)

( * ) Notice: Subject to any disclaimer, the term of this patent is extended or adjusted under 35 U.S.C. 154(b) by 0 days.

(21) Appl. No.: 10/698,103

(22) Filed: Oct. 31, 2003

(65) Prior Publication Data

US 2004/0160562 A1 Aug. 19, 2004

(30) Foreign Application Priority Data

Oct. 31, 2002 (JP) ............................ 2002-318805

(51) Int. Cl.
- *G02F 1/1343* (2006.01)
- *G02F 1/1333* (2006.01)
- *G02F 1/1337* (2006.01)
- *G02F 1/13* (2006.01)
- *G09G 3/36* (2006.01)

(52) U.S. Cl. .................. 349/141; 349/40; 349/129; 349/192; 345/87

(58) Field of Classification Search .............. 349/40, 349/129, 141, 192; 345/87, 93
See application file for complete search history.

(56) References Cited

U.S. PATENT DOCUMENTS

| | | | | |
|---|---|---|---|---|
| 5,946,060 A | * | 8/1999 | Nishiki et al. ............... 349/48 |
| 5,986,735 A | * | 11/1999 | Komatsu .................... 349/128 |
| 6,115,093 A | * | 9/2000 | Murai et al. ................ 349/129 |
| 6,335,776 B1 | * | 1/2002 | Kim et al. .................. 349/129 |
| 6,583,836 B1 | * | 6/2003 | Kim et al. .................. 349/129 |
| 6,603,525 B1 | * | 8/2003 | Yamakita et al. ........... 349/139 |
| 2001/0043304 A1 | * | 11/2001 | Matsumoto ................. 349/141 |
| 2002/0018155 A1 | * | 2/2002 | Nagata et al. ............... 349/42 |

FOREIGN PATENT DOCUMENTS

JP 59-031928 * 2/1984

* cited by examiner

*Primary Examiner*—Tarifur R. Chowdhury
(74) *Attorney, Agent, or Firm*—Trop, Pruner & Hu, P.C.

(57) ABSTRACT

An image display apparatus comprises a pixel electrode, a common electrode, and a switching element to control an electric potential supplied to the pixel electrode. In addition, an auxiliary electrode forms an auxiliary capacitance between a portion of the auxiliary electrode and a portion of the pixel electrode. The common electrode is adapted to be set at a first electric potential, and the auxiliary electrode is adapted to be set at a second, different electric potential.

35 Claims, 9 Drawing Sheets

SETTING A COMMON ELECTRODE AND AUXILIARY ELECTRODE OF AN IMAGE DISPLAY APPARATUS TO DIFFERENT ELECTRIC POTENTIALS

BACKGROUND

In-plane switching type (hereafter referred to as "IPS type") image display apparatus have been proposed in the field of image display apparatus that display images using, for example, the electro-optical effect of liquid crystal molecules. The IPS type of image display apparatus applies an electric field to direct the orientation of the liquid crystal molecules in a direction parallel to the surface of the substrate that holds the liquid crystal layer containing liquid crystal molecules. Since the IPS type image display apparatus have superior characteristics in terms of the voltage retaining properties and the view angle compared with conventional image display apparatus, they have been considered to be particularly promising recently.

FIG. 9 shows the basic configuration of an array substrate that constitutes a conventional IPS type image display apparatus. As shown in FIG. 9, the array substrate of the IPS type image display apparatus has a structure in which common electrodes 102 and 103 are deployed away from pixel electrode 101 in the horizontal direction, and auxiliary electrode 104 is deployed under pixel electrode 101. A thin film transistor 105 that functions as a switching element is deployed in the vicinity of a pixel electrode 101. One source/drain electrode of thin film transistor 105 is connected to the pixel electrode 101, and the other source/drain electrode is connected to signal line 107. Furthermore, the gate electrode of thin film transistor 105 is connected to scanning line 106. Common electrodes 102 and 103 are connected to constant voltage supplying circuit 108 that supplies a constant electric potential; auxiliary electrode 104 is also connected to constant voltage supplying circuit 108, and each is maintained at a constant electric potential.

Scanning line 106 is given a prescribed electric potential to drive thin film transistor 105, and the electric charge supplied from signal line 107 is accumulated in pixel electrode 101. Since common electrodes 102 and 103 maintain a constant electric potential, an electric potential difference corresponding to the accumulated electric charge arises between pixel electrode 101 and common electrodes 102 and 103, and an electric field arises in a direction parallel to the array substrate. An IPS type image display apparatus has a structure in which a large number of pairs of pixel electrode and common electrodes shown in FIG. 9 are deployed corresponding to the number of display pixels, and a prescribed number of signal lines and scanning lines are deployed corresponding to such pairs. This apparatus performs the aforementioned operation to each pixel electrode, and displays images by using the electro-optical effect that arises in the liquid crystal layer encapsulated on the array substrate.

Auxiliary electrode 104 is deployed under pixel electrode 101, and is deployed in such a way that the auxiliary electrode 104 overlaps with pixel electrode 101 via a prescribed dielectric layer. As a result, the pixel electrode 101, the dielectric layer, and auxiliary electrode 104 form an auxiliary capacitance. This auxiliary capacitance has the role of stabilizing the electric potential of pixel electrode 101. The scanning line 106, signal line 107 and such that are deployed near pixel electrode 101 are designed to have electric potentials that vary over a prescribed range, and the auxiliary capacitance is provided to prevent this electric potential variation from influencing pixel electrode 101. In view of the stability of the electric potential of pixel electrode 101, it is preferable that auxiliary electrode 104 maintain a constant electric potential. Therefore, auxiliary electrode 104 is connected to constant voltage supplying circuit 108, and as a result, auxiliary electrode 104 and common electrodes 102 and 103 are maintained at an identical electric potential.

In common image display apparatus including IPS type image display apparatus, signal lines, scanning lines, and prescribed electrodes are insulated from each other, which results in a tendency to hold electrostatic charge during manufacturing. For example, during a film forming process in a clean room, friction between the surface of the array substrate and the source gas flowing in the clean room can cause electrostatic charging. Thus, for example, if signal line 106, which is connected to the gate electrode of thin film transistor 105, is electrostatically charged, the gate potential of thin film transistor 105 might exceed an allowable limit. If the gate electric potential exceeds an allowable limit causing destruction of the thin film transistor, the thin film transistor 105 can no longer supply the electric charge to a corresponding pixel electrode, which prevents proper operation of the image display.

For a mechanism to discharge the electrostatic charge to the outside, shunt line 109 and switching element 110 are deployed on the array substrate, as shown in FIG. 9. Specifically, shunt line 109 is electrically connected via switching element 110 to scanning line 106, and shunt line 109 is also connected to constant electric potential source 108.

Switching element 110 is formed by an active element that is a combination of a plurality of thin film transistors, for example. Switching element 110 is designed to turn on and conduct a current between shunt line 109 and scanning line 106 when the electric potential difference between shunt line 109 and scanning line 106 reaches or exceeds a prescribed value. Switching element 110 is formed in such a way that the electric potential of scanning line 106 at the time when switching element 110 turns on is lower than the electric potential at which thin film transistor 105 is destroyed.

Electrostatic charge in scanning line 106 can be discharged to the outside by connecting scanning line 106 and constant voltage supplying circuit 108 via switching element 110 and shunt line 109. Specifically, when scanning line 106 is electrostatically charged and the electric potential of scanning line 106 reaches or exceeds the prescribed value, switching element 110 is turned on based on the electric potential difference between scanning line 106 and shunt line 109, and now there is electrical conduction between scanning line 106 and shunt line 109. Therefore, the electrostatic charge in scanning line 106 flows out via switching element 110 and shunt line 109 to constant voltage supplying circuit 108, and the electric potential of scanning line 106 decreases down to a level equivalent to the level before the electrostatic.

However, a conventional IPS type image display apparatus as shown in FIG. 9 has various issues. First, the image display apparatus shown in FIG. 9 may experience burn-in, which occurs when a constant image is displayed on the screen for a long period of time before switching to a different image, resulting in the previous image faintly remaining on the screen.

The burn-in phenomenon occurs particularly in the area corresponding to an end portion of auxiliary electrode 104. Despite attempts to eliminate the burn-in phenomenon, no effective countermeasure has been provided.

Another issue associated with the image display apparatus of FIG. 9 is that, during array substrate testing, units that can be turned into non-defective units are erroneously recognized as defective units. As shown in FIG. 9, scanning line 106 and connecting line 111 are deployed in such a way that they partially overlap, with an insulation layer provided in between to prevent electrical conduction between scanning line 106 and connecting line 111. However, if electrical conduction occurs between scanning line 106 and connecting line 111 for some reason (such as due to a short circuit defect), the drive state of thin film transistor 105 cannot be controlled any more and a line-like display defect and/or dot-like display defect or color heterogeneity occurs, resulting in deteriorated image quality.

Because of this, after completion of the manufacturing process of the image display apparatus, usually a prescribed electric potential is applied on scanning line 106 to test if any current flows into constant voltage supplying circuit 108. The presence of an inflow current is deemed to indicate the presence of electrical conduction between scanning line 106 and connecting line 111 and the image display apparatus subjected to the test is diagnosed as defective.

In the case of the image display apparatus of FIG. 9, there are cases when the inflow current exists in the aforementioned test but there is no electrical conduction between scanning line 106 and connecting line 111. As shown in FIG. 9, shunt line 109 and scanning line 106 partially overlap with each other and electrical conduction sometimes occurs between shunt line 109 and scanning line 106 just as in the case of connecting line 111. In this case, a current also flows into constant voltage supplying circuit 108 if a prescribed electric potential is applied on scanning line 106.

As described above, shunt line 109 is provided to prevent thin film transistor 105 from being destroyed by electrostatic charging at the time of manufacturing of the array substrate. Therefore, once the image display apparatus is completed shunt line 109 does not have a particular function. Even when there is electrical conduction between shunt line 109 and scanning line 106, there is no particular problem in using the image display apparatus if shunt line 109 and constant voltage supplying circuit 108 are disconnected from each other.

However, in the case of the image display apparatus shown in FIG. 9, there is no way to tell whether the electrical conduction is occurring between the scanning line 106 and the connecting line 111 or shunt line 109. Therefore, when a current flows into constant voltage supplying circuit 108 in the test, there is no other choice than to discard the unit as defective, which results in lower manufacturing yield.

SUMMARY

In general, according to one embodiment, an image display apparatus includes a pixel electrode, a common electrode, and a switching element to control supply of an electric potential to the pixel electrode. An auxiliary electrode forming an auxiliary capacitance is provided between a portion of the auxiliary electrode and a portion of the pixel electrode. The common electrode is adapted to be set at a first electric potential, and the auxiliary electrode is adapted to be set at a second, different electric potential Other or alternative features will become apparent from the following description, from the drawings, and from the claims.

DETAILED DESCRIPTION

Figure 1:
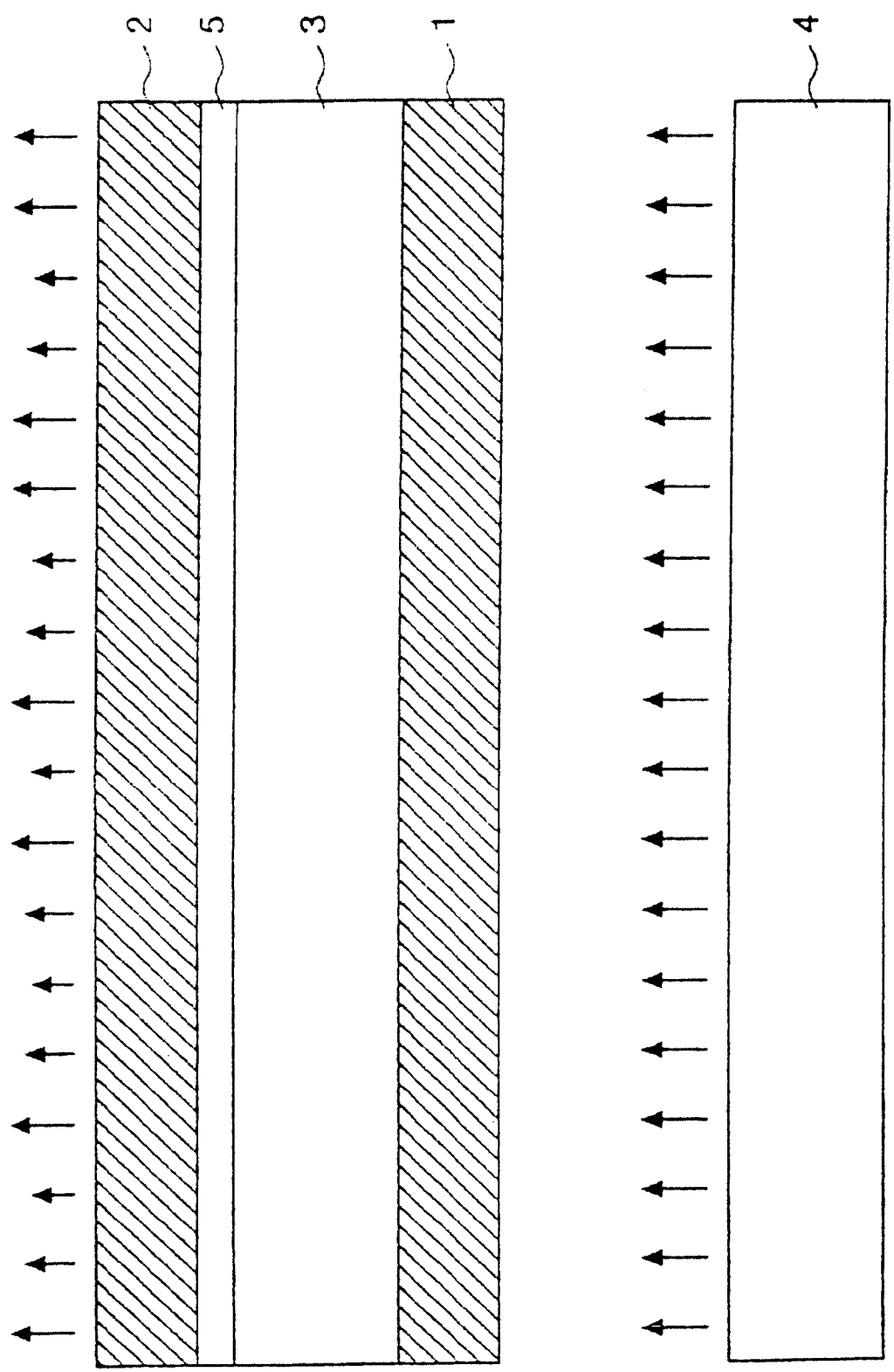
FIG. 1 is a cross-sectional view of the image display apparatus according to a first embodiment.

In accordance with some embodiments of the invention, an image display apparatus includes an in-plane switching image display apparatus that comprises a pixel electrode and a common electrode corresponding to a display pixel on an array substrate. The image display apparatus displays an image by controlling the electric potential of the pixel electrode to produce an electric field parallel to the array substrate surface. The array substrate includes a switching element that controls the electric potential supplied to the pixel electrode, an auxiliary electrode that forms auxiliary capacitance between itself and at least a part of the pixel electrode, a scanning line that controls the drive state of the switching element, and a signal line that has a changing electric potential in relation to a prescribed center electric potential and supplies the electric potential to the pixel electrode via the switching element. In addition, the array substrate includes a common electrode electric potential supplying section that supplies an electric potential different from the center electric potential to the common electrode, and an auxiliary electrode electric potential supplying section that supplies an electric potential to the auxiliary electrode such that the absolute value of the difference value from the center electric potential of the signal line becomes smaller than the absolute value of the difference value between the center electric potential of the signal line and the electric potential supplied by the common electrode electric potential supplying section.

The center electric potential of the signal line is a value obtained by taking the arithmetic average of the maximum value and the minimum value of the electric potential of the signal line when, for example, displaying an image having the identical gradation.

By adjusting the electric potential of each wiring so that the absolute value of the difference value between the electric potential of the auxiliary electrode and the center electric potential of the signal line is smaller than the absolute value of the difference value between the center electric potential of the signal line and the electric potential of the common electrode, the DC electric field component arising between the signal line and the auxiliary electrode is reduced and the burn-in of the displayed image due to this DC electric field component is suppressed to a visually unrecognizable level, thus implementing a image display apparatus capable of displaying high quality images.

Image display apparatus according to some embodiments of the present invention are described in further detail below by referring to the drawings. Please note that the drawings are for illustration and differ from the actual objects. Also, relationships and ratios of dimensions in different drawings are partially different. In the following embodiment, when there are a plurality of parts having the identical structure, one representative part may be described. For example, when a plurality of identical parts exist such as "pixel electrodes 7a and 7b," they may be given a generic designation such as "pixel electrode 7." Also, with regard to a thin film transistor mentioned in the following description, since there is not sufficient necessity to distinguish between the source electrode and drain electrode, the two electrodes other than the gate electrode are both called the "source/drain" electrode. In the following description, the thin film transistor is assumed to have an n channel; however, it is a matter of course that the same can be said about a p channel thin film transistor just by reversing the electrical polarity.

Embodiment 1

An image display apparatus according to a first embodiment of the present invention is described below by using a liquid crystal display apparatus as an example. The image display apparatus according to the first embodiment is an IPS type image display apparatus having a pixel electrode and a common electrode deployed on the same substrate. The image display apparatus has a structure wherein the electric potential of an auxiliary electrode that forms an auxiliary capacitance with a portion of the pixel electrode is controlled. Specifically, the adjustment is done in such a way that the absolute value of the difference value between the electric potential of the auxiliary electrode and the center electric potential of the signal line that supplies the display signal to the pixel electrode is smaller than the absolute value of the difference value between the center electric potential of the signal line and the electric potential of the common electrode.

FIG. 1 is a schematic diagram showing the overall structure of the image display apparatus according to the first embodiment. The image display apparatus has array substrate 1 on which circuit elements are formed corresponding to the display pixels. An opposite substrate 2 is deployed opposite to array substrate 1, and liquid crystal layer 3 containing liquid crystal molecules having prescribed orientation properties is encapsulated between array substrate 1 and opposite substrate 2. A backlight unit 4 is deployed under array substrate 1. Backlight unit 4 has the function of providing white light that proceeds in a planar fashion against the back side of array substrate 1. On each of the surfaces of array substrate 1 and opposite substrate 2 that contact liquid crystal layer 3, an orientation membrane, not shown, is provided to regulate the orientation properties of the liquid crystal molecules contained in liquid crystal layer 3 when an electric field is not applied.

To control the light transmission through liquid crystal layer 3 in response to the image pattern to be displayed, a pixel electrode and common electrode corresponding to the display pixel are deployed on array substrate 1. Light transmission is adjusted by controlling the orientation properties of the liquid crystal molecules contained in liquid crystal layer 3 by generating an electric field between the pixel electrode and common electrode. The electric field is parallel to the interface between array substrate 1 and liquid crystal layer 3.

In the image display apparatus, the light from backlight unit 4 goes through liquid crystal layer 3, whose light transmission is adjusted so that light and shade corresponding to the light transmission are displayed on the outer surface of opposite substrate 2 to thereby display an image. The image display apparatus has a color filter 5 on opposite substrate 2 so that the image display apparatus is capable of displaying not only light and shade but also three colors, R, G, and B.

Figure 2:
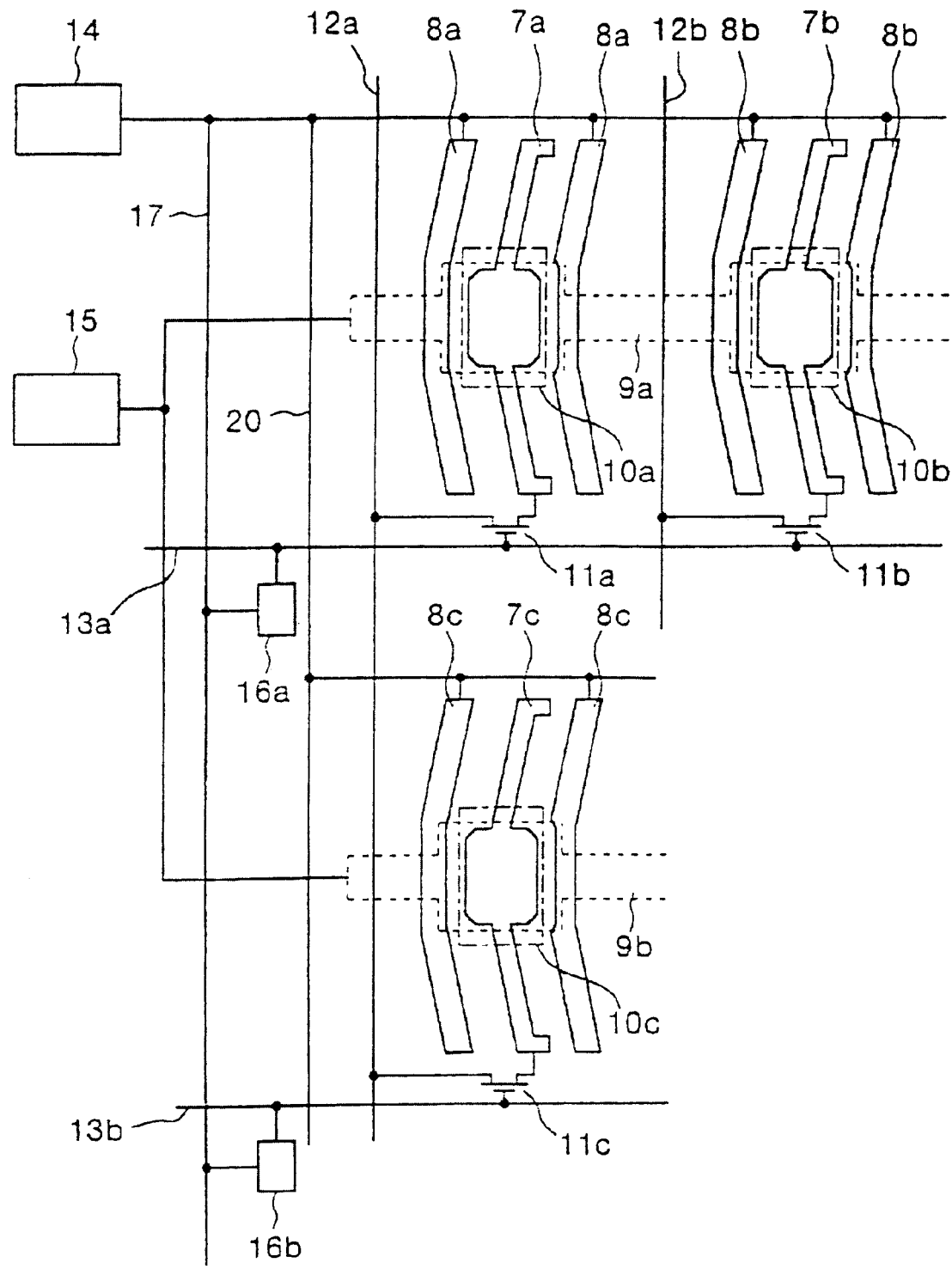
FIG. 2 is a circuit diagram showing the structure of the array substrate in the image display apparatus of FIG. 1.

FIG. 2 is a circuit diagram that shows the wiring structure of circuit elements deployed on array substrate 1. A pixel electrode 7 corresponding to a display pixel and common electrode 8 deployed near pixel electrode 7, are provided on array substrate 1. Also provided on array substrate 1 is auxiliary electrode 9 which is deployed in such a way that it overlaps with a portion of pixel electrode 7, with an insulation layer in between the auxiliary electrode 9 and the pixel electrode 7. The pixel electrode 7, auxiliary electrode 9 and the insulation layer in between form an auxiliary capacitance 10.

A thin film transistor 11 that functions as a switching element for pixel electrode 7 is deployed near pixel electrode 7. The thin film transistor 11 and pixel electrode 7 are electrically connected via one of the source/drain electrodes of thin film transistor 11. The other source/drain electrode of thin film transistor 11 is positioned near pixel electrode 7 and connected to signal line 12 that extends in a longitudinal direction, and the gate electrode is positioned near pixel electrode 7 and connected to scanning line 13 that extends in a lateral direction.

Furthermore, signal line 12 is connected to a signal line drive circuit (not shown in the figure) that supplies the display signal, and scanning line 13 is connected to the scanning line drive circuit (not shown in the figure) that supplies a scanning signal.

Also, common electrode 8 is connected to the first electric potential supplying section 14 and maintained at the electric potential supplied by the first electric potential supplying section 14. Similarly, auxiliary electrode 9 that forms auxiliary capacitance 10 is connected to the second electric potential supplying section 15 and maintained at the electric potential supplied by the second electric potential supplying section 15. The first electric potential supplying section 14 and the second electric potential supplying section 15 are designed to supply different electric potentials. Specifically the first electric potential supplying section 14 and the second electric potential supplying section 15 are adjusted in such a way that the absolute value of the difference value between the electric potential of auxiliary electrode 9 and the center electric potential of signal line 12 is smaller than the absolute value of the difference value between the center electric potential of signal line 12 and the electric potential of common electrode 8. The advantage of having such an electric potential relationship is described later in detail.

Furthermore, scanning line 13 is connected via switch section 16 and shunt line 17 to the first electric potential supplying section 14. Switch section 16 is designed to conduct a current when the electric potential difference between scanning line 13 and shunt line 17 (which is connected to electric potential supplying section 14) is a predetermined value or higher. Specifically, switch section 16 is made of thin film transistors 18 and 19 (FIG. 3) whose gate and source are shunted to each other. The gate electrode of thin film transistor 18 is connected to scanning line 13 and the gate electrode of thin film transistor 19 is connected to shunt line 17.

Next, functions of the circuit elements deployed on array substrate 1 are described below. Pixel electrode 7 has the role of generating an electric field parallel to the surface of array substrate 1 between itself and common electrode 8. Specifically, pixel electrode 7 is supplied an electric potential corresponding to the display image via thin film transistor 11, and generates an electric field between itself and common electrode 8 whose electric potential is maintained approximately at a constant electric potential. This electric field controls the orientation properties of the liquid crystal molecules contained in liquid crystal layer 3 that is encapsulated on array substrate 1 to enable image display. Common electrode 8 is connected to the first electric potential supplying section 14 and its electric potential is controlled by the first electric potential supplying section 14. The electric potential of common electrode 8 can be time dependent. However, since it is well known that the electric potential variations in common electrode 8 influence the electric potential of pixel electrode 7, the electric potential of common electrode 8 in the following description is assumed to maintain a constant value without time dependent changes.

Pixel electrode 7 and common electrode 8 each has a bent plane configuration. The plane configuration of pixel electrode 7 and common electrode 8 can be rod-like, but a bent configuration is preferable because this way the view angle-dependent color variation can be suppressed and an image display apparatus having a wide view angle can be implemented.

Signal line 12 has the role of supplying a display signal to pixel electrode 7 and thus providing a prescribed electric potential to the pixel electrode 7. Specifically, signal line 12 is connected via thin film transistor 11 to pixel electrode 7 and provides the electric potential to pixel electrode 7 by supplying a prescribed electric potential to it when thin film transistor 11 turns on.

The role of scanning line 13 is to control the drive state of thin film transistor 11 by supplying a scanning signal to it. Since scanning line 13 is connected to the gate electrode of thin film transistor 11, it controls the drive state of thin film transistor 11 by controlling the gate electric potential with the scanning signal.

The role of auxiliary capacitance 10 is to stabilize the electric potential of pixel electrode 7. Stabilization of the electric potential of pixel electrode 7 provides for high quality image display. In practice, a phenomenon is known in which a source-gate parasitic capacitance of thin film transistor 11 connected to pixel electrode 7 causes the electric potential of pixel electrode 7 and the electric potential of scanning line 13 to be capacitively coupled, thus shifting the electric potential of pixel electrode 7. Because of this, the auxiliary capacitance 10 is provided to reduce the electric potential shift. The auxiliary electrode 9 that forms auxiliary capacitance 10 is connected to the second electric potential supplying section 15, and the electric potential of auxiliary electrode 9 is controlled by the second electric potential supplying section 15. It is possible to control the electric potential of auxiliary electrode 9 by the second electric potential supplying section 15 in such a way that the electric potential has time dependent variations. Time dependent variations in the electric potential of auxiliary electrode 9, however, generally influence the electric potential of pixel electrode 7. Therefore, in the following description, the electric potential of auxiliary electrode 9 is assumed to be maintained at an approximately constant value without time dependent variations.

The role of switch section 16 and shunt line 17 is to prevent the destruction of thin film transistor 11 due to electrostatic charging of scanning line 13 at the time of manufacturing of array substrate 1. That is, electrostatic charging of scanning line 13 before scanning line 13 is connected to the scanning line drive circuit can cause an excessive electric potential on the gate electrode of thin film transistor 11 connected to scanning line 13, potentially resulting in destruction of thin film transistor 11. In the image display apparatus according to the first embodiment, however, switch section 16 turns on as scanning line 13 is electrostatically charged and conducts current between scanning line 13 and shunt line 17 so that the static electricity diffuses to common electrode 8 and such, thus preventing an excessive electric potential from occurring at the gate electrode of thin film transistor 11.

The drive voltage of thin film transistor 18 that is a part of switch section 16 is set at a prescribed value and, as mentioned before, the gate electrode of thin film transistor 18 is connected to scanning line 13 and one source/drain electrode is connected to shunt line 17. Because of this, when the electric potential of scanning line 13 rises due to electrostatic charging and the voltage difference between scanning line 13 and shunt line 17 exceeds the prescribed value, thin film transistor 18 is turned on to electrically connect scanning line 13 and shunt line 17, thus diffusing the electric charge.

The same is true for the case wherein negative electrostatic charge causes the electric potential of scanning line 13 in relation to common electrode 8 to fall lower. Specifically, when negative electrostatic charging occurs, thin film transistor 19 that is a part of switch section 16 is turned on to conduct current between scanning line 13 and shunt line 17, thus diffusing the negative electric charge and preventing adverse effects on the circuit.

Figure 4:
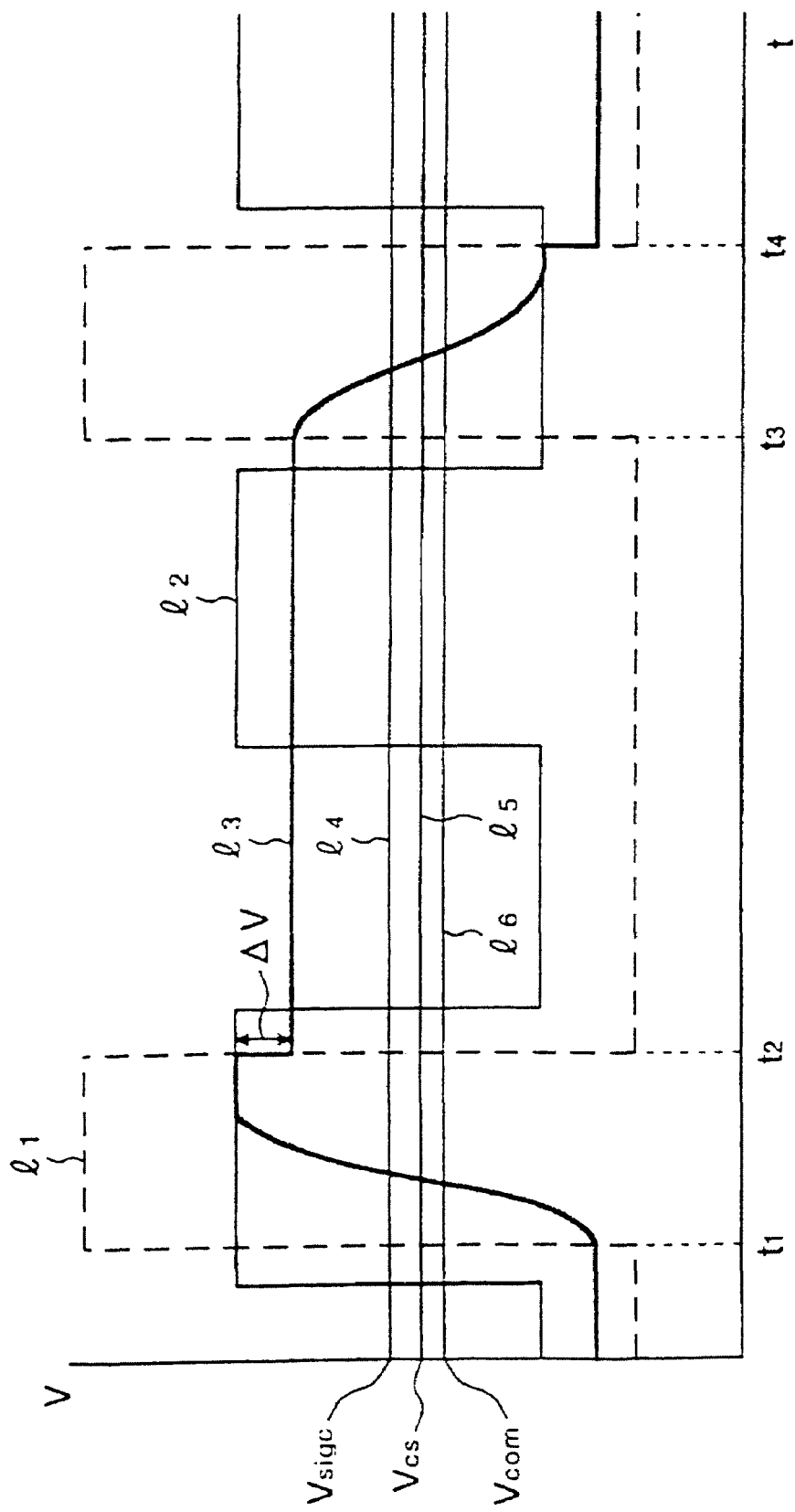
FIG. 4 is a flowchart showing variations in the electric potential supplied to circuit elements on the array substrate in the image display apparatus of FIG. 1.

Next, the relationship between the electric potential of common electrode 8 provided by the first electric potential supplying section 14, the electric potential of auxiliary electrode 9 provided by the second electric potential supplying section 15, and the center electric potential of signal line 12 is described below. FIG. 4 is a timing chart showing the electric potential variations in common electrode 8 and auxiliary electrode 9, the center electric potential of signal line 12, and so forth, when the image display apparatus is in operation. Specifically, in FIG. 4, curve $1_1$ indicates the electric potential variations in scanning line 13, curve $1_2$ indicates the electric potential variations in signal line 12, and curve $1_3$ indicates the electric potential variations in pixel electrode 7. Also, curve $1_4$ indicates center electric potential $V_{sigc}$ of signal line 12, curve $1_5$ indicates electric potential $V_{cs}$ of auxiliary electrode 9, and curve $1_6$ indicates electric potential $V_{com}$ of common electrode 8. To facilitate understanding, FIG. 4 shows a timing chart of each electric potential assuming that there is only one display pixel. An actual array substrate 1 has a large number of display pixels, and therefore, the actual electric potential variations do not necessarily match the timing chart shown in FIG. 4, as FIG. 4 is only an illustrative timing chart. Also, FIG. 4 shows an example wherein an image with the same gradation is displayed.

As shown in FIG. 4, scanning line 13 assumes the high electric potential during time periods $t_1 <= t <= t_2$ and $t_3 <= t <= t_4$ to turn on thin film transistor 11 that functions as a switching element. In those periods, thin film transistor 11 is turned on and therefore electric charge is gradually supplied to pixel electrode 7 via thin film transistor 11, and pixel electrode 7 is driven to the same electric potential as that of signal line 12.

In the next time frame, the electric potential is written also in the same manner. During $t_3 <= t <= t_4$, scanning line 13 assumes the high electric potential and thin film transistor 11 is turned on again, so that the electric potential of signal line 12 is supplied to pixel electrode 7 via thin film transistor 11. The electric potential of signal line 12 during $t_3 <= t <= t_4$ is set to have a different polarity than the polarity at the previous frame.

After the prescribed electric potential is supplied to pixel electrode 7, as the electric potential of scanning line 13 lowers at t=t2 and t4, the electric potential of pixel electrode 7 also shifts downward by $\Delta V$. This is because parasitic capacitance inevitably arises between the gate electrode of thin film transistor 11 and one of the source/drain electrodes, and the gate electrode is connected to scanning line 13 and the source/drain electrode is connected to pixel electrode 7, thus generating capacitive coupling between scanning line 13 and pixel electrode 7.

Due to the capacitive coupling and the electric potential variations in scanning line 13, the center of the electric potential of pixel electrode 7 shifts downward by $\Delta V$ in relation to center electric potential $V_{sigc}$ of signal 12. Therefore, the electric potential $V_{com}$ of common electrode 8, which is paired with pixel electrode 7 to generate an electric field for the liquid crystal layer, is also shifted downward by $\Delta V$ in relation to the center electric potential $V_{sigc}$ of signal line 12. Therefore, as shown in FIG. 4, center electric potential $V_{sigc}$ of signal line 12 and electric potential $V_{com}$ of common electrode 8 satisfies $V_{sigc} > V_{com}$.

Figure 9:
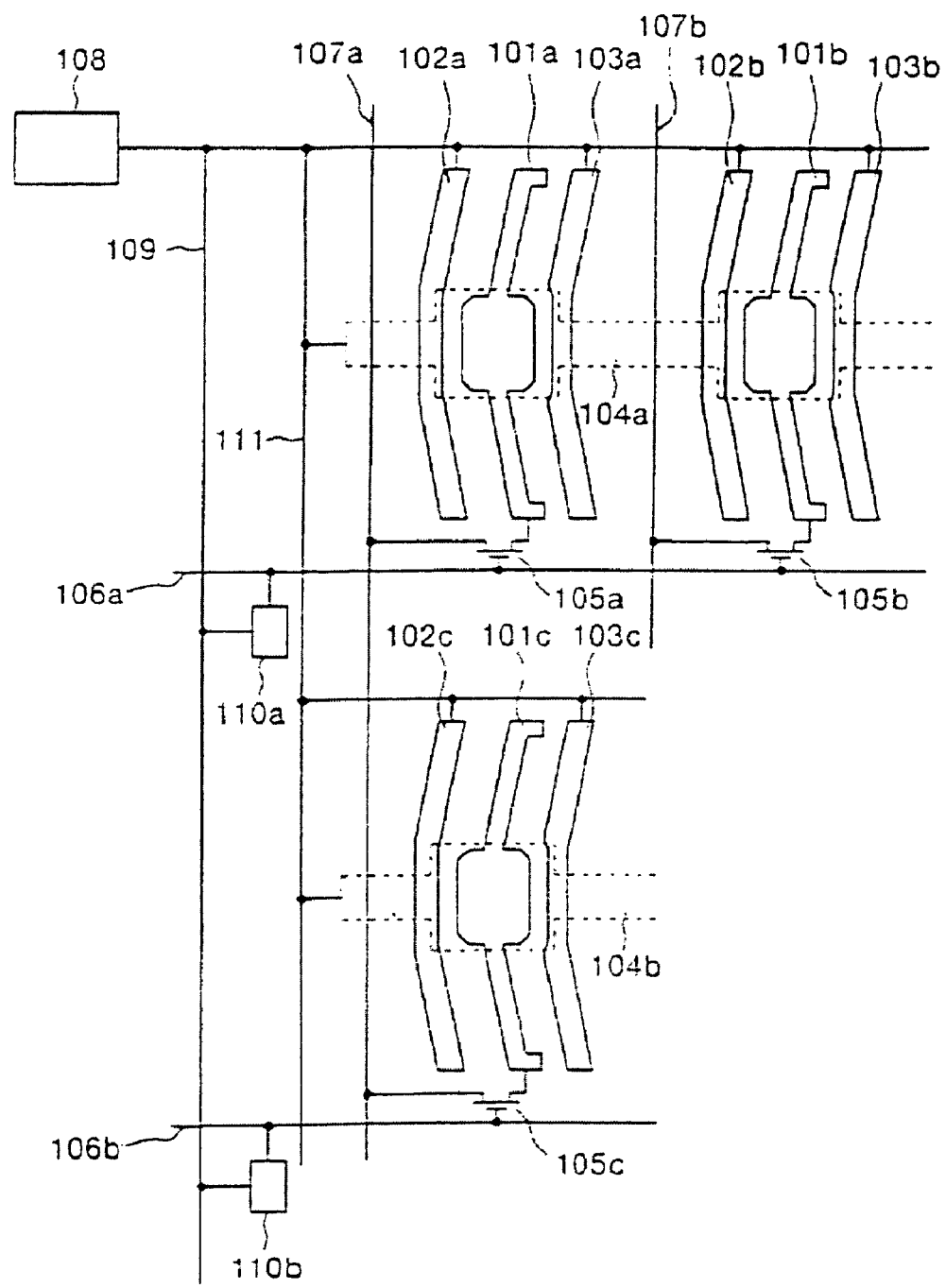
FIG. 9 is a circuit diagram showing the structure of an image display apparatus according to conventional technology.

Electric potential $V_{cs}$ of auxiliary electrode 9 is described next. As described above, auxiliary electrode 9 has the function of forming an auxiliary capacitance between itself and pixel electrode 7 to stabilize the electric potential of pixel electrode 7 and thus reduce the electric potential shift. As mentioned above, in view of stabilizing the electric potential of pixel electrode 7, the electric potential of auxiliary electrode 9 and the electric potential of common electrode 8 should each preferably be maintained constant. Conventionally, the auxiliary electrode 9 and common electrode 8 is connected to a common electric potential supplying section and maintained at the same electric potential (see FIG. 9).

However, the electric field arising between auxiliary electrode 9 and signal line 12 has an influence on the orientation properties of the liquid crystal molecules contained in the liquid crystal layer, giving rise to the burn-in phenomenon on displayed images. If the electric potential of auxiliary electrode 9 is set to be equal to that of common electrode 8, then there is always $\Delta V'$ of a difference between the center electric potential of signal line 12 and auxiliary electrode 9. The DC electric field component due to this electric potential difference disrupts the orientation of the liquid crystal molecules to give rise to burn-in.

Therefore, in the image display apparatus according to the first embodiment, for the purpose of preventing burn-in, auxiliary electrode 9 is connected to the second electric potential supplying section 15, which is independent from common electrode 8, and thus an electric potential different from that of common electrode 8 is provided to auxiliary electrode 9. Specifically, the second electric potential supplying section 15 controls the electric potential of auxiliary electrode 9 in such a way that the absolute value of the difference value between the electric potential of auxiliary electrode 9 and the center electric potential of signal line 12 is smaller than the absolute value of the difference value between the center electric potential of signal line 12 and the electric potential of common electrode 8. Maintaining the electric potential of auxiliary electrode 9 in this range makes it possible to reduce the DC electric field component arising between signal line 12 and auxiliary electrode 9 to lower than the conventional level, and thus makes it possible to reduce burn-in that occurs when images are displayed.

Figure 5A:
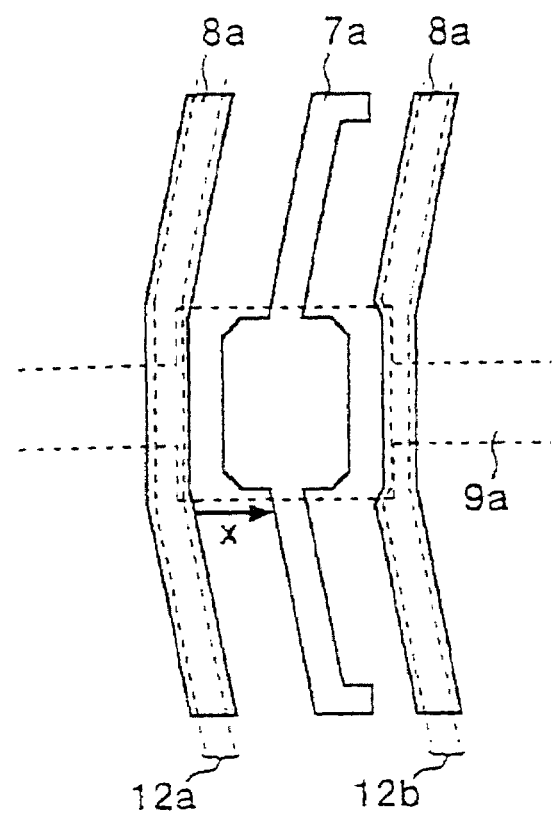
FIG. 5(a) shows an area where burn-in tends to occur in a conventional image display apparatus.
Figure 5B:
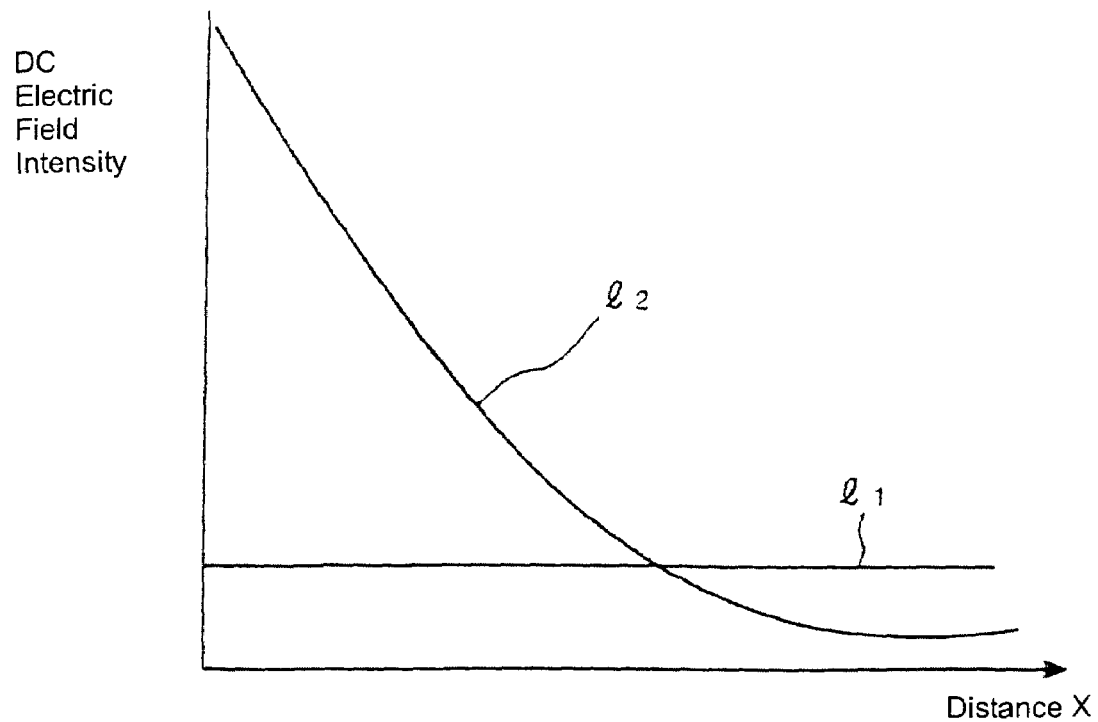
FIG. 5(b) is a graph showing the intensity of the DC electric field component in the area shown in 5(a).

FIG. 5(a) is a drawing to show regions where burn-in tends to occur when an image is displayed on a conventional image display apparatus. FIG. 5(b) is an illustrative graph showing a changing DC electric field along the area indicated by an arrow in FIG. 5(a). As shown in FIG. 5(a), signal line 12 is actually positioned right under common electrode 8 and there is a portion where signal line 12 and auxiliary electrode 9 are close to each other such as in the area indicated by the arrow in FIG. 5(a). In FIG. 5(b), curve $1_1$ indicates the intensity of the DC electric field component in the image display apparatus according to the first embodiment, and curve $1_2$ indicates the intensity of the DC electric field component in a conventional image display apparatus, in which the auxiliary electrode and the common electrode have the same electric potential. The origin of the horizontal axis of the graph of FIG. 5(b) is, as shown in FIG. 5(a), a point in the opening that is nearest to signal line $1_2$; the x axis is set along the edge of auxiliary electrode 9 directed away from signal line $1_2$.

As curve $1_2$ of FIG. 5(b) clearly indicates, the conventional image display apparatus has the maximum DC electric field intensity in the area where distance x is small, i.e. near the origin of the arrow in FIG. 5(a), and the DC electric field intensity decreases as distance x increases. On the other hand, in the image display apparatus according to the first embodiment, the electric potential of auxiliary electrode 9 is set closer to the center electric potential of signal line 12 than it is in a conventional design and therefore, as shown in curve $1_1$, the intensity of the DC electric field component decreases and also becomes uniform regardless of the value of distance x. Therefore, in the image display apparatus according to the first embodiment, the occurrence of burn-in in the area where auxiliary electrode 9 and signal line 12 come close can be suppressed to a level that is not problematic in actual use.

In the above description of the first embodiment, the electric potential of common electrode 8 defined by the first electric potential supplying section 14 and the electric potential of auxiliary electrode 9 defined by the second electric potential supplying section 15 are constant. However, these electric potentials can be designed to have time dependent changes. For example, it is useful to slightly raise the electric potential of common electrode 8 at $t=t_2$, $t_4$. By raising the electric potential of common electrode 8 at $t=t_2$, $t_4$, it is possible to reduce the electric potential drop of pixel electrode 7, $\Delta V$, caused by the sudden drop of the electric potential of scanning line 13. For the burn-in due to the DC electric field arising between signal line 12 and auxiliary electrode 9 to be suppressed down to a visually unrecognizable level, a solution is to either always maintain the magnitude relationship mentioned above or to set the first electric potential supplying section 14 and the second electric potential supplying section 15 in such a way that the average value of the electric potential of auxiliary electrode 9 comes in between the average electric potential of common electrode 8 and the center electric potential of signal line 12.

In the first embodiment, the thin film transistor is an n-channel type and therefore the center electric potential of signal line 12 is higher than the electric potential of common electrode 8. However, the electric properties are reversed when a p-channel thin film transistor is used. The electric potential of common electrode 8 therefore becomes higher than the center electric potential of signal line 12; but burn-in can still be suppressed to a visually unrecognizable level if the absolute value of the difference value between the electric potential of auxiliary electrode 9 and the center electric potential of signal line 12 is smaller than the absolute value of the difference value between the center electric potential of signal line 12 and the electric potential of common electrode 8.

Also, since the electric potential of auxiliary electrode 9 is set according to the absolute value of the difference value, the electric potential of auxiliary electrode 9 can be set higher than the center electric potential of signal line 12 even when an n-channel thin film transistor is used, for example. However, when the electric potential of auxiliary electrode 9 is too high there may be a problem with other wiring structures depending on the structure of the array substrate. To address this, the second electric potential supplying section 15 to control the electric potential of auxiliary electrode 9 is set to be lower than the center electric potential of signal line 12.

Embodiment 2

Figure 6:
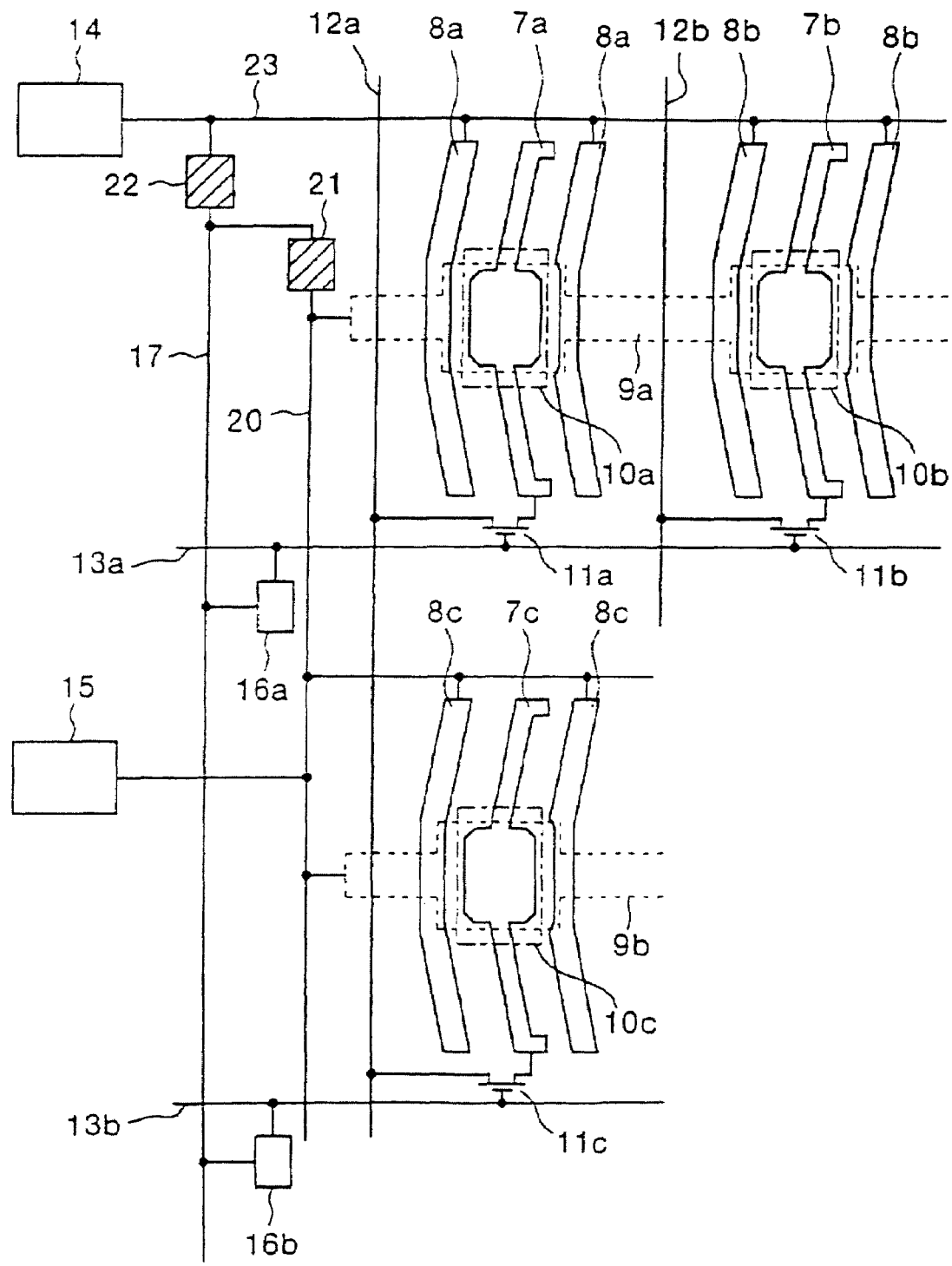
FIG. 6 is a circuit diagram showing the structure of the array substrate in the image display apparatus according to a second embodiment.

Next, the image display apparatus according to the second embodiment is described below. In the structure of the image display apparatus according to the second embodiment, the first electric potential supplying section, connected to the common electrode, is connected to the auxiliary electrode and shunt line via different switching means having different electrical properties so that, when wiring short-circuits, the short-circuited wiring can be identified. FIG. 6 shows the elements deployed on the array substrate that constitutes the image display apparatus according to the second embodiment. In the structure shown in FIG. 6, the switching means connected to the auxiliary electrode and the switching means connected to the shunt line share some portion in common, but, as described later, providing these separately will not cause a problem. Also, since the image display apparatus according to the second embodiment has the same basic structure as that of the first embodiment, the following description will primarily focus on parts that are different from the image display apparatus according to the first embodiment.

As shown in FIG. 6, in the image display apparatus according to the second embodiment, common electrode 8 is connected to the first electric potential supplying section 14 and the auxiliary electrode 9 is connected to the second electric potential supplying section 15. Common electrode 8 and auxiliary electrode 9 are connected to each other via switch sections 21 and 22, and the structure is such that, when the electric potential difference between common electrode 8 and auxiliary electrode 9 reaches a prescribed value, electrical conduction between the electrodes occurs. Shunt line 17 connects to common electrode 8 via switch section 22 only. Switch sections 21 and 22 can be implemented with any structure as long as the conditions specified later are met. In the second embodiment, the switch sections 21 and 22 are formed by a combination of a plurality of thin film transistors whose gate and source are short-circuited to each other, similar to the structure shown in FIG. 3.

Since the basic configuration of the image display apparatus according to the second embodiment is the same as that of the image display apparatus according to the first embodiment, operations and such are omitted from the description, and the following description focuses on the advantages of this embodiment in the case of short-circuiting between wirings.

The wiring structures that constitute the circuit on the array substrate are arranged in three dimensions; for example, shunt line 17, wiring 20 and such are deployed in such a way that they partially overlap scanning line 13, and an insulation layer is provided in between these wirings to prevent electrical conduction. However, the thickness of the insulation layer in between is as thin as several hundred nanometers to several micrometers, and therefore dielectric breakdown may occur due to some cause during the manufacturing process. For the purpose of improving the manufacturing yield, locations of dielectric breakdown need to be identified.

Figure 7:
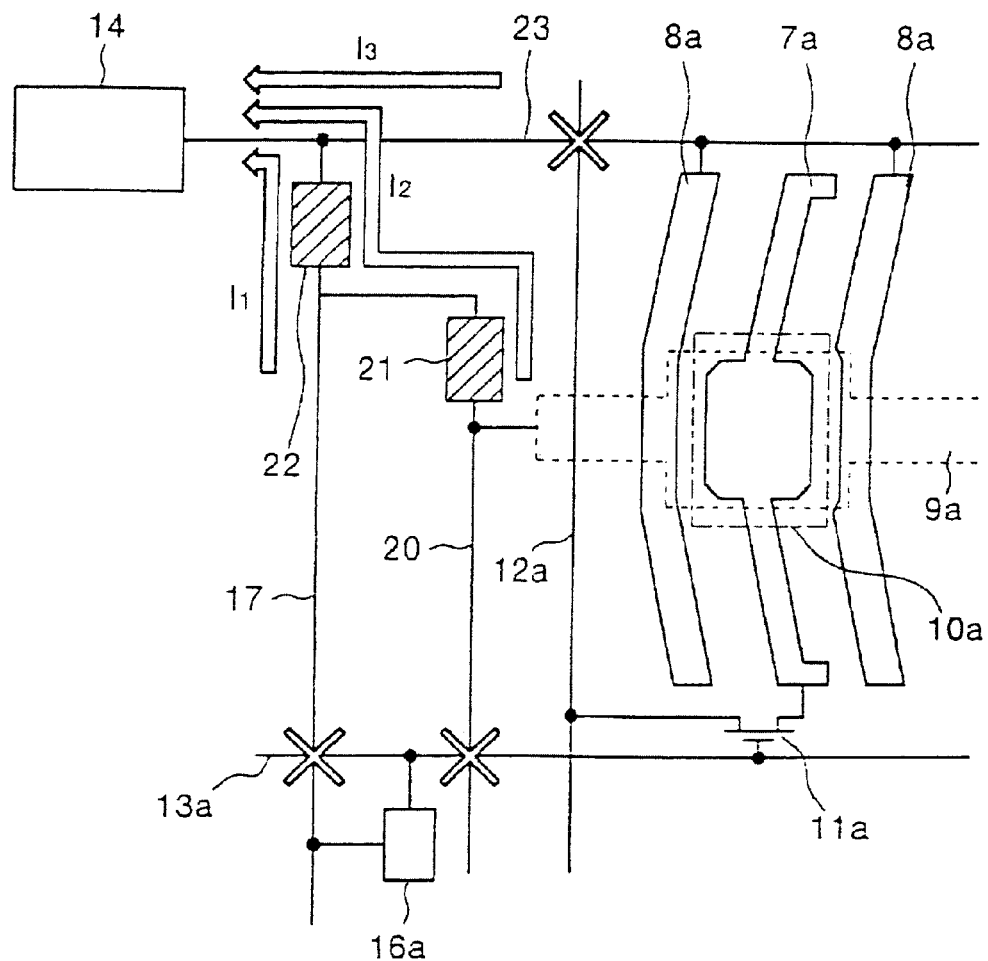
FIG. 7 is a diagram for explaining the operation of the array substrate in the image display apparatus of FIG. 6.

The image display apparatus according to the second embodiment is designed to have electrode 8, auxiliary electrode 9 and shunt line 17 connect to the first electric potential supplying section with different connection modes. Due to these differences between the connection modes, the current value flowing into the first electric potential supplying section 14 when each wiring short-circuits to scanning line 13 and such is different, which allows identification of the short-circuited wiring. A detailed description is given below by referring to FIG. 7. In the description below, the thin film transistors constituting switch sections 21 and 22 are assumed to have the same electrical properties, e.g. identical threshold voltage and I-V characteristics. The electric potential of scanning line 13 at the time of short-circuiting is assumed to be substantially higher than the threshold voltage of the thin film transistors constituting switch sections 21 and 22. These assumptions are strictly for facilitating easier understanding, as the operation is possible under conditions other than these mentioned here.

First, a case of short-circuiting between scanning line 13 and shunt line 17 is described. When this short-circuiting occurs, the electric potential of shunt line 17 becomes equal to that of scanning line 13, and voltage V1, equivalent to the electric potential difference between scanning line 13 and common electrode 8, is generated across switch section 22. Therefore, the thin film transistor in switch section 22 is turned on, and current $I_1$ corresponding to voltage $V_1$, based on the I-V characteristics of the thin film transistor, flows into the first electric potential supplying section 14.

Next, a case of short-circuiting between scanning line 13 and shunt line 20 is described below. When this short-circuiting occurs, the electric potential of wiring 20 becomes equal to the electric potential of scanning line 13. Assume switch section 21 and switch section 22 are equivalent to one switching element, voltage $V_1$, corresponding to the electric potential difference between scanning line 13 and common electrode 8, is generated across this equivalent switching element. In this case a plurality of switching elements, switch sections 21 and 22, are deployed between wiring 20 and common electrode 8, and voltage V1 is distributed between switch section 21 and switch section 22.

When switch sections 21 and 22 have the identical structure and their electrical properties are the same, voltage $V_1$ is distributed evenly to switch section 21 and switch section 22, and the voltage applied across each of switch section 21 and switch section 22 is $V_1/2$. Therefore, the gate-source voltage applied to each thin film transistor constituting switch sections 21 and 22 is also $V_1/2$, and current $I_2$ corresponding to this gate-source voltage flows from wiring 20 to first electric potential supplying section 14. Since the gate-source voltage in the case of short-circuiting between scanning line 13 and shunt line 17 is different from the gate-source voltage in this case, the values of current $I_1$ and current $I_2$ are different.

Finally, a case of short-circuiting between wiring 23, which connects common electrode 8 and the first electric potential supplying section 14, and signal line 12 is described below. When this short-circuiting occurs, current $I_3$, which is defined by the electric potential difference between signal line 12 and the first electric potential supplying section 14 and the resistance between the short-circuited point in wiring 23 and first electric potential supplying section 14, flows into the first electric potential supplying section 14. Since such current $I_3$ is obviously defined independently from the electrical properties of the thin film transistor constituting switch sections 21 and 22, current $I_3$ assumes a different value compared with current $I_1$ or $I_2$.

In the three examples described thus far, the current values flowing into first electric potential supplying section 14 are different in the image display apparatus according to the second embodiment. Therefore, when a short circuit is detected in a substrate test, for example after the manufacturing of the array substrate, the wiring that has the short circuit can be identified by measuring the current flowing into first electric potential supplying section 14.

The advantages of identifying short-circuited wirings during the substrate test are as follows. For example, as described in connection with the first embodiment, shunt line 17 is for discharging the electrostatic charge in scanning line 13 and such during the manufacturing. After connections are made to the signal line drive circuit and such, shunt line 17 does not have particular functions; therefore breakage of shunt line 17 would not affect the operation of the image display apparatus. Therefore, when shunt line 17 and scanning line 13 are short-circuited, a current leak can be prevented and the unit can be made non-defective by breaking shunt line 17 by means of laser cutting and such. On the other hand, when the short-circuited wiring cannot be identified, it is impossible to ascertain whether the short-circuited wiring is repairable or not, and the unit has to be discarded as defective when a short circuit is detected. Therefore, in the case of the image display apparatus according to the second embodiment, the manufacturing yield can be improved by using an appropriate defect detection means.

In the second embodiment, the absolute value of the difference value between the electric potential of auxiliary electrode 9, supplied by second electric potential supplying section 15, and the center electric potential of signal line 12 is set smaller than the absolute value of the difference value between the center electric potential of signal line 12 and the electric potential of common electrode 8. Furthermore, it is desired in some implementations that the electric potential of auxiliary electrode 9 be between the electric potential of common electrode 8 supplied by first electric potential supplying section 14 and the center electric potential of signal line 12. This is because, just as in the case of the first embodiment, maintaining the electric potential of auxiliary electrode 9 in this range enables suppression of the burn-in phenomenon.

Figure 8A:
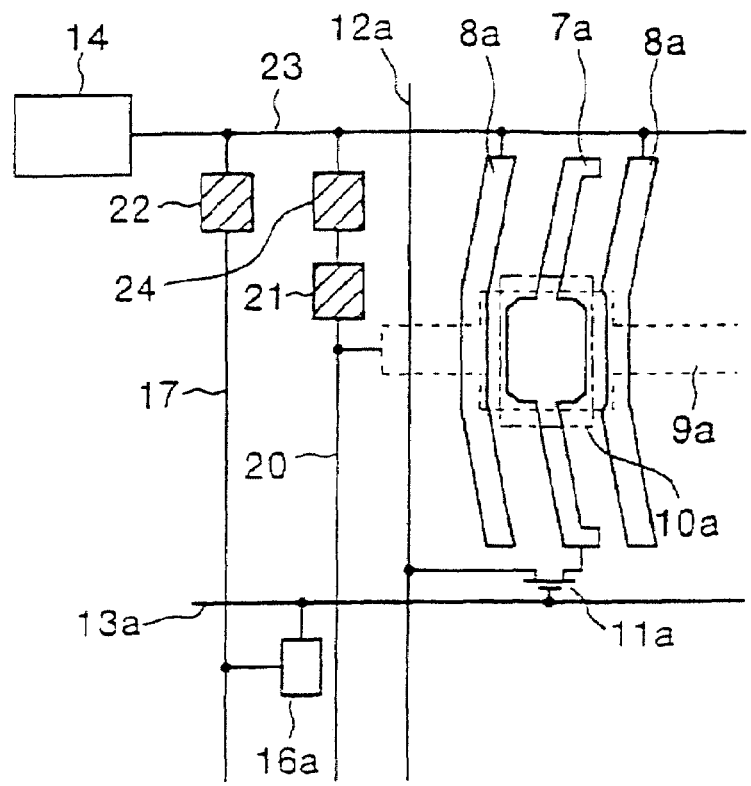
FIGS. 8(a)–(b) are circuit diagrams showing variants of the image display apparatus of the second embodiment.
Figure 8B:
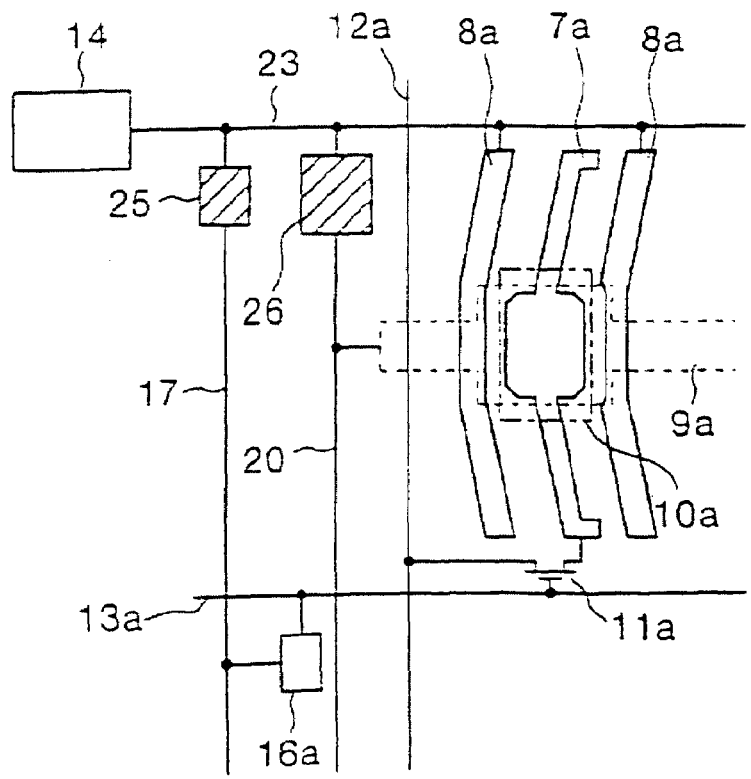

Also, in the second embodiment, switch section 22 functions as a switching means for shunt line 17 and also as a part of a switching means for auxiliary electrode 9. Sharing a part of the switching means has the advantage of reducing the footprint compared with when providing separate switching means. By the way, this does not exclude a structure in which the switching means for shunt line 17 and the switching means for auxiliary electrode 9 are separately provided. For example, as shown in FIG. 8(a), an alternate structure can be used in which switch section 22 is deployed between shunt line 17 and first electric potential supplying section 14, and switch sections 21 and 24 are deployed between wiring 20 and first electric potential supplying section 14. In the description of FIG. 6 and FIG. 8(a), each switch section is assumed to have the same electrical properties; however, as shown in FIG. 8(b), an alternate structure can be used which uses switch sections 25 and 26 having different electrical properties from each other. By forming switch sections 25 and 26 with thin film transistors having different threshold voltages, I-V characteristics and such from each other, the current value flowing into first electric potential supplying section 14 when scanning line 13, for example, becomes different for different wirings, allowing identification of short-circuited wiring.

Figure 3:
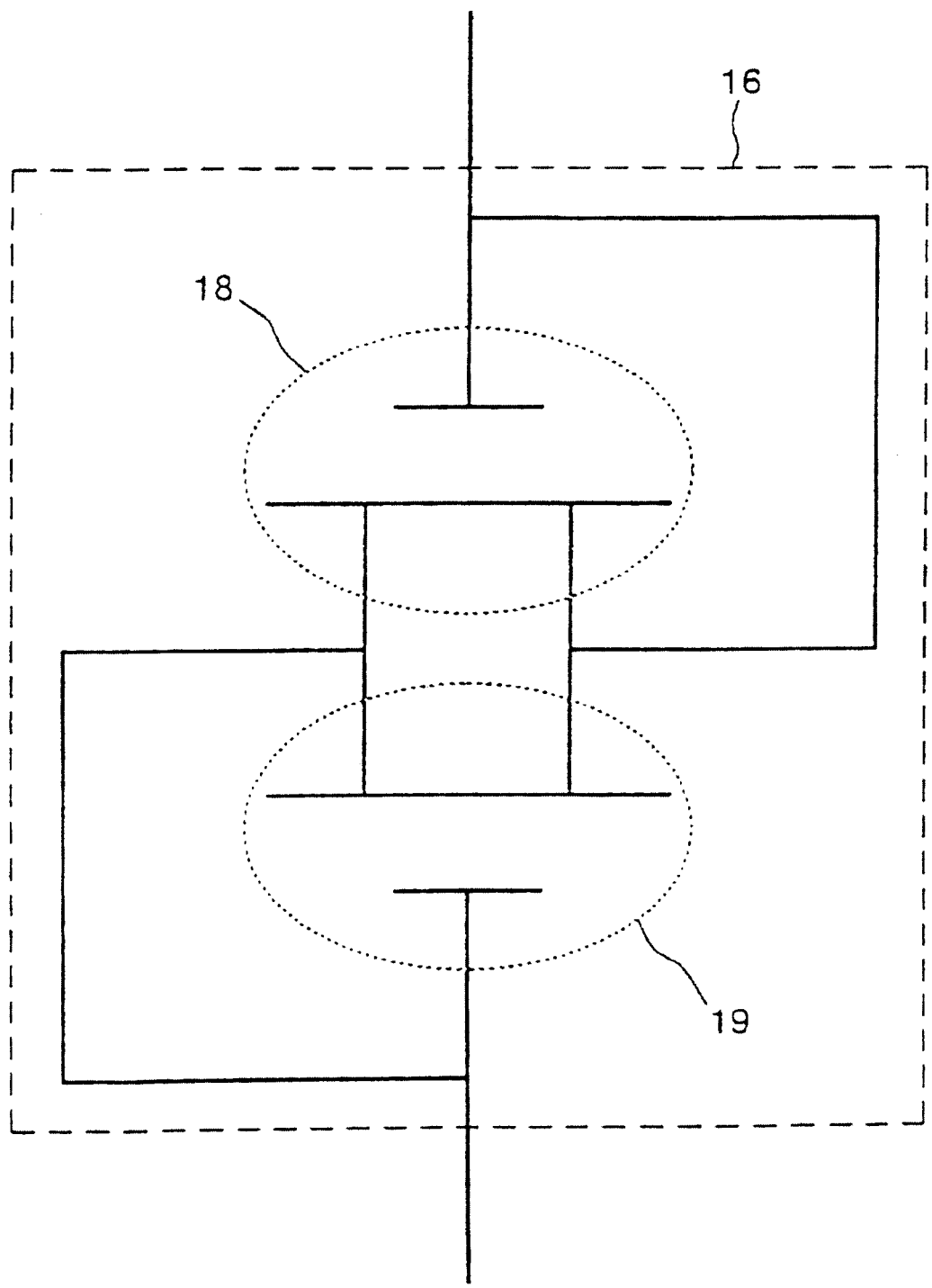
FIG. 3 is a circuit diagram showing the structure of a switching element in the image display apparatus of FIG. 1.

For switch sections 16, 21, 22, 25, and 26, an alternative structure other than the structure shown in FIG. 3 can be used. The alternative structure is composed of a single thin film transistor wherein its gate electrode and one source/drain electrode are short-circuited to each other and the other source/drain electrode and the gate electrode are connected to the first electric potential supplying section 14 and such. In other words, this structure has only one of thin film transistors 18 and 19 in FIG. 3. The on/off of the structure shown in FIG. 3 is controlled based on the absolute value of the electric potential difference across the switch section. However, when detecting the presence of a short circuit during the substrate test, if the electric potential of scanning line 13 is consistently larger or smaller than the electric potential of the first electric potential supplying section 14, then the on/off of the switch section does not have to be controlled by the absolute value of the electric potential and the detection of a short circuit between different types of wiring is possible by controlling the on/off based simply on the electric potential difference.

Also, the switch section can be constructed by using circuit elements other than thin film transistors. For example, when the electric potential supplied to auxiliary electrode 9 by the second electric potential supplying section 15 is higher than the electric potential supplied to common electrode 8 by the first electric potential supplying section 14, the switch section can be constructed by a diode whose anode connects to the side of the first electric potential supplying section 14.

With this structure, the diode is turned off in the normal state, in which there is not a short circuit between the wirings of different types. When a short circuit occurs between the wirings of different types, the breakdown voltage is applied on the diode by applying an appropriate electric potential on scanning line 13 during the substrate test. The applied electric potential turns on the diode and a current flows into the first electric potential supplying section 14. In the structure shown in FIG. 6, providing at least one switch section having a diode results in different current values between the current from shunt line 17 and the current from wiring 20, allowing identification of the short-circuited wiring. Even if the structure does not have a diode, connecting switch sections with different electrical properties from each other to shunt line 17 and wiring 20 allows different current values when a short circuit occurs, thus allowing identification of the short-circuited wiring.

As described thus far, an effect of some embodiments of the present invention is as follows: by adjusting the electric potential of each wiring so that the absolute value of the difference value between the electric potential of the auxiliary electrode and the center electric potential of the signal line is smaller than the absolute value of the difference value between the center electric potential of the signal line and the electric potential of the common electrode, the DC electric field component arising between the signal line and the auxiliary electrode is reduced and the burn-in of the displayed image due to this DC electric field component is suppressed to a non-visible level, thus implementing a image display apparatus capable of displaying high quality images.

Another effect of some embodiments of the present invention is as follows: the shunt line and the auxiliary electrode connect to the common electrode via switching means having different electrical properties. Therefore, the current value flowing into the common electrode and the wiring structure directly connected to the common electrode is different depending on whether the shunt line or the auxiliary electrode (and the wiring structure directly connected to the auxiliary electrode) is short-circuited to another wiring structure. This makes it possible to identify the short-circuited wiring by measuring the inflow current value.

Another effect of some embodiments of the present invention is as follows: the second switching means and the third switching means share some part in common; therefore, the area occupied by the switching means on the array substrate can be reduced and an image display apparatus having a high aperture can be implemented.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An image display apparatus comprising:
   an array substrate;
   a pixel electrode;
   a common electrode;
   a switching element to control supply of an electric potential to the pixel electrode; and
   an auxiliary electrode forming an auxiliary capacitance between a portion of the auxiliary electrode and a portion of the pixel electrode,
   wherein the pixel electrode, common electrode, switching element, and auxiliary electrode are formed on the array substrate,
   the common electrode adapted to be set at a first electric potential, and
   the auxiliary electrode adapted to be set at a second, different electric potential.

2. The image display apparatus of claim 1, comprising an in-plane switching image display apparatus.

3. The image display apparatus of claim 1, further comprising:
   a first electric potential supplying section to supply the first electric potential to the common electrode; and
   a second electric potential supplying section to supply the second electric potential to the auxiliary electrode.

4. The image display apparatus of claim 1, wherein an electric field is generated between the pixel electrode and common electrode in response to application of the electric potential to the pixel electrode by the switching element.

5. The image display apparatus of claim 4,
   wherein the electric field being is generally parallel to a surface of the array substrate on which the pixel electrode, common electrode, switching element, and auxiliary electrode are formed.

6. The image display apparatus of claim 1, wherein the switching element comprises a thin film transistor.

7. The image display apparatus of claim 1, further comprising:
   a signal line, the switching element connected between the signal line and the pixel electrode; and
   a scanning line to turn the switching element on or off.

8. The image display apparatus of claim 7, wherein the pixel electrode and common electrode are associated with a first display pixel, the image display apparatus further comprising,
   additional pixel electrodes and common electrodes associated with other display pixels.

9. The image display apparatus of claim 8, wherein the additional pixel electrodes comprise a second pixel electrode, and the additional common electrodes comprise a second common electrode,
   the image display apparatus further comprising:
   a second switching element to control an electric potential supplied to the second pixel electrode; and
   a second auxiliary electrode forming an auxiliary capacitance between a portion of the second auxiliary electrode and a portion of the second pixel electrode,
   wherein the second common electrode is adapted to be set at the first electric potential, and
   wherein the second auxiliary electrode is adapted to be set at the second electric potential.

10. The image display apparatus of claim 1, further comprising:
    a signal line, the switching element connected between the signal line and the pixel electrode;
    a scanning line to turn the switching element on or off;
    a shunt line connected to the common electrode; and
    a switching section connected between the scanning line and the shunt line,
    the switching section adapted to turn on in response to an elevated voltage on the scanning line.

11. The image display apparatus of claim 1, further comprising a short-circuit detector to detect a source of a short circuit.

12. An image display apparatus comprising:
    a pixel electrode;
    a common electrode;
    a switching element to control supply of an electric potential to the pixel electrode;
    an auxiliary electrode forming an auxiliary capacitance between a portion of the auxiliary electrode and a portion of the pixel electrode,
    the common electrode adapted to be set at a first electric potential, and
    the auxiliary electrode adapted to be set at a second, different electric potential; and
    a short-circuit detector to detect a source of a short circuit,
    wherein the short-circuit detector is adapted to produce a first current in response to a short circuit at a first source and to produce a second; different current in response to a short circuit at a second source.

13. The image display apparatus of claim 12, wherein the short-circuit detector comprises switching elements, a first one of the switching elements to turn on in response to a short circuit at a first location, and a second one of the switching elements to turn on in response to a short circuit at a second location.

14. The image display apparatus of claim 13, wherein at least one of the switching elements comprises a diode.

15. An image display apparatus comprising:
a pixel electrode;
a common electrode;
a switching element to control supply of an electric potential to the pixel electrode;
an auxiliary electrode forming an auxiliary capacitance between a portion of the auxiliary electrode and a portion of the pixel electrode,
the common electrode adapted to be set at a first electric potential, and
the auxiliary electrode adapted to be set at a second, different electric potential; and
a signal line, the switching element connected between the signal line and the pixel electrode,
wherein an absolute value of a difference value between the second electric potential of the auxiliary electrode and a center electric potential of the signal line is less than an absolute value of a difference value between the center electric potential of the signal line and the first electric potential of the common electrode.

16. The image display apparatus of claim 15, wherein the center electric potential of the signal line is a value obtained by taking an average of a maximum value and a minimum value of the electric potential of the signal line.

17. An in-plane switching image display apparatus that comprises an array substrate, and a pixel electrode and a common electrode corresponding to a display pixel on the array substrate, the image display apparatus to display an image by controlling the electric potential of said pixel electrode to produce an electric field parallel to a surface of said array substrate, said array substrate comprising:
a switching element to control the electric potential supplied to said pixel electrode;
an auxiliary electrode that forms an auxiliary capacitance between itself and at least a part of said pixel electrode;
a scanning line to control a drive state of said switching element;
a signal line that has a changing electric potential in relation to a prescribed center electric potential, the signal line to supply the electric potential to said pixel electrode via said switching element;
a common electrode electric potential supplying section to supply an electric potential different from said center electric potential to said common electrode; and
an auxiliary electrode electric potential supplying section to supply an electric potential to said auxiliary electrode such that an absolute value of a difference value from said center electric potential of said signal line is smaller than an absolute value of a difference value between the center electric potential of said signal line and the electric potential supplied by said common electrode electric potential supplying section.

18. An in-plane switching image display apparatus that comprises an array substrate and a pixel electrode and a common electrode corresponding to a display pixel on the array substrate, the image display apparatus to display an image by controlling the electric potential of said pixel electrode to produce an electric field parallel to a surface of said array substrate, said array substrate comprising:
a switching element to control the electric potential supplied to said pixel electrode;
a scanning line to control a drive state of said switching element;
a signal line to supply an electric potential via said switching element to said pixel electrode;
a common electrode electric potential supplying section to supply an electric potential to said common electrode,
an auxiliary electrode that forms auxiliary capacitance between itself and at least a part of said pixel electrode;
an auxiliary electrode electric potential supplying section to supply an electric potential to said auxiliary electrode;
a first switching section;
a shunt line connected to said scanning line via the first switching section whose on/off state is controlled based on an electric potential difference between the shunt line and the scanning line;
a second switching section deployed between said common electrode and said auxiliary electrode that controls a conduction state between said common electrode and said auxiliary electrode; and
a third switching section deployed between said common electrode and said shunt line that controls the conduction state between said common electrode and said shunt line and has electrical properties different from those of said second switching section.

19. The image display apparatus of claim 18, wherein the electric potential supplied by said auxiliary electrode potential supplying section is such that an absolute value of a difference value from said center electric potential of said signal line becomes smaller than an absolute value of a difference value between the center electric potential and the electric potential supplied by said common electrode electric potential supplying section.

20. The image display apparatus of claim 19, wherein said second switching section and said third switching section share at least some part in common.

21. The image display apparatus of claim 18, wherein said second switching section and said third switching section share at least some part in common.

22. The image display apparatus of claim 18, wherein said common electrode electric potential supplying section and said auxiliary electrode electric potential supplying section each respectively provides a constant electric potential without time dependent changes.

23. The image display apparatus of claim 22, wherein said switching element comprises a thin film transistor.

24. The image display apparatus of claim 23, wherein said second switching section and said third switching section each comprises a thin film transistor whose gate electrode is short-circuited to one source/drain electrode.

25. The image display apparatus of claim 23, further comprising an opposite substrate that is deployed opposite to said array substrate and a liquid crystal layer encapsulated between said array substrate and said opposite substrate.

26. The image display apparatus of claim 22, wherein said second switching section and said third switching section each comprises a thin film transistor whose gate electrode is short-circuited to one source/drain electrode.

27. The image display apparatus of claim 22, further comprising an opposite substrate that is deployed opposite to said array substrate and a liquid crystal layer encapsulated between said array substrate and said opposite substrate.

28. The image display apparatus of claim 18, wherein said switching element comprises a thin film transistor.

29. The image display apparatus of claim 18, wherein said second switching section and said third switching section each comprises a thin film transistor whose gate electrode is short-circuited to one source/drain electrode.

30. The image display apparatus of claim 29, further comprising an opposite substrate that is deployed opposite to said array substrate and a liquid crystal layer encapsulated between said array substrate and said opposite substrate.

31. The image display apparatus of claim 18, further comprising an opposite substrate that is deployed opposite to said array substrate and a liquid crystal layer encapsulated between said array substrate and said opposite substrate.

32. The image display apparatus of claim 31, further comprising a backlight source that provides light that penetrates through the inside of said liquid crystal layer.

33. A method for use with an image display apparatus having a pixel electrode, a common electrode, and an auxiliary electrode forming an auxiliary capacitance between a portion of the auxiliary electrode and a portion of the pixel electrode, the pixel electrode, common electrode, and auxiliary electrode formed on an array substrate, the method comprising:

controlling supply of an electric potential to the pixel electrode on the array substrate with a switching element;

setting the common electrode on the array substrate at a first electric potential; and setting the auxiliary electrode on the array substrate at a second, different electric potential.

34. The method of claim 33, wherein setting the common electrode at a first electric potential is performed by a first electric potential supplying section, and wherein setting the auxiliary electrode at the second electric potential is performed by a second electric potential supplying section.

35. The method of claim 33, further comprising generating an electric field between the pixel electrode and common electrode in response to application of the electric potential to the pixel electrode by the switching element, the electric field being generally parallel to a surface of the array substrate on which the pixel electrode, common electrode, and auxiliary electrode are formed.

* * * * *